United States Patent [19]

Takao et al.

[11] Patent Number: 5,015,692

[45] Date of Patent: May 14, 1991

[54] PROCESS FOR PREPARING MODIFIED DIENE POLYMER RUBBERS

[75] Inventors: Hiroyoshi Takao, Chiba; Akio Imai, Ichihara; Tomoaki Seki, Ichihara; Mitsuji Tsuji, Ichihara, all of Japan

[73] Assignee: Sumitomo Chemical Company Limited, Osaka, Japan

[21] Appl. No.: 501,700

[22] Filed: Mar. 30, 1990

Related U.S. Application Data

[60] Division of Ser. No. 415,380, Sep. 29, 1989, Pat. No. 4,957,976, which is a continuation of Ser. No. 126,338, Nov. 30, 1987, abandoned.

[30] Foreign Application Priority Data

| Dec. 1, 1986 [JP] | Japan | 61-287091 |
| Dec. 27, 1986 [JP] | Japan | 61-315210 |
| Dec. 27, 1986 [JP] | Japan | 61-315211 |
| Jan. 28, 1987 [JP] | Japan | 62-19262 |
| Jan. 28, 1987 [JP] | Japan | 62-19263 |
| Feb. 16, 1987 [JP] | Japan | 62-32782 |

[51] Int. Cl.$^5$ ............................................. C08F 8/32
[52] U.S. Cl. ..................................... 525/102; 525/209
[58] Field of Search ............................... 525/102, 209

[56] References Cited

U.S. PATENT DOCUMENTS

| 2,035,698 | 1/1940 | Fisher . | |
| 2,315,885 | 4/1943 | Howland . | |
| 3,244,664 | 4/1966 | Zelinski et al. . | |
| 3,268,495 | 8/1966 | Convert et al. . | |
| 3,322,738 | 5/1967 | Uraneck et al. . | |
| 3,324,089 | 6/1967 | Trepka . | |
| 3,853,605 | 12/1974 | Fahey | 525/102 |
| 3,872,057 | 3/1975 | Pazos . | |
| 3,955,036 | 5/1976 | Plueddemann | 525/102 |
| 4,146,585 | 3/1979 | Ward et al. | 525/102 |
| 4,277,565 | 7/1981 | Oda et al. . | |
| 4,463,129 | 7/1984 | Shinada et al. | 525/102 |
| 4,485,833 | 12/1984 | Uraneck et al. . | |
| 4,581,415 | 4/1986 | Boyle, Jr. et al. . | |
| 4,780,358 | 10/1988 | Ito et al. | 525/102 |

FOREIGN PATENT DOCUMENTS

2073004 10/1971 France .
2251567 6/1975 France .
59-117514 7/1984 Japan .

Primary Examiner—Bernard Lipman
Attorney, Agent, or Firm—Armstrong, Nikaido, Marmelstein, Kubovcik & Murray

[57] ABSTRACT

A process for preparing modified diene polymer rubbers having an increased impact resilience and a reduced hardness at low temperatures and useful as rubber materials for automobile tires and other industries which comprises producing an alkali metal-containing conjugated diene polymer, and reacting the alkali metal-containing polymer with a modifier selected from the group consisting of a nitro compound, a phosphoryl chloride compound of the formula:

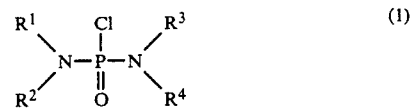

(1)

wherein $R^1$ to $R^4$ are independently an alkyl group, and an aminosilane compound of the formula:

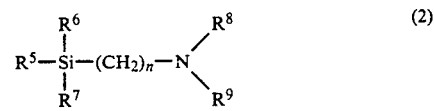

(2)

wherein $R^5$ to $R^7$ are independently an alkyl group or an alkoxyl group, $R^8$ and $R^9$ are independently an alkyl group, and n is an integer, said alkali metal-containing diene polymer being prepared by a living anionic polymerization using an alkali metal-based catalyst or by an addition reaction of a diene polymer having conjugated diene units and an alkali metal-based catalyst in a hydrocarbon solvent. The modified diene polymers can be incorporated with usual rubber additives to provide rubber compositions for various purposes, and the cured products show an increased impact resilience and a reduced hardness at low temperatures.

6 Claims, No Drawings

PROCESS FOR PREPARING MODIFIED DIENE POLYMER RUBBERS

This is a division of application Ser. No. 415,380 filed Sept. 29, 1989, now U.S. Pat. No. 4,957,976, which is a continuation of application Ser. No. 126,338, filed Nov. 30, 1987, now abandoned.

BACKGROUND OF THE INVENTION

The present invention relates to a process for preparing modified diene polymer rubbers having an improved impact resilience and a low hardness at low temperatures, and more particularly to a process for preparing modified elastomeric polymers of conjugated diene compounds by introducing particular atomic groups to conjugated diene polymers.

Conjugated diene polymers such as polybutadiene and a styrene-butadiene copolymer have hitherto been used as rubbers for automobile tire treads. In recent years, from the viewpoint of demands in low fuel cost for automobiles and in running safety on snow and ice roads, rubber materials having a low rolling resistance and a large grip force on ice and snow roads have been desired as rubbers for automobile tire treads.

The rolling resistance is correlative to the impact resilience of polymers. The rolling resistance is decreased with increasing the impact resilience. On the other hand, it is known that the grip force on snow and ice roads is correlative to the hardness at low temperatures, and that the smaller the hardness at low temperatures, the larger the grip force on snow and ice roads. Known rubber materials are not satisfactory in these properties for practical use.

It is an object of the present invention to provide a conjugated diene rubber having an improved impact resilience and a low hardness at low temperatures.

A further object of the present invention is to provide a process for modifying a conjugated diene polymer to improve the impact resilience and to lower the hardness under an atmosphere of low temperatures.

These and other objects of the present invention will become apparent from the description hereinafter.

SUMMARY OF THE INVENTION

It has now been found that the above-mentioned objects can be achieved by reacting an alkali metal-containing diene polymer with a particular compound as a modifier to thereby introduce a particular atomic group to the diene polymer.

In accordance with the present invention, there is provided a process for preparing a modified diene polymer which comprises reacting an alkali metal-containing conjugated diene polymer with a modifier selected from the group consisting of a nitro compound, a phosphoryl chloride compound of the formula (1):

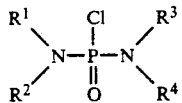

(1)

wherein $R^1$, $R^2$, $R^3$ and $R^4$ are an alkyl group, and an aminosilane compound of the formula (2):

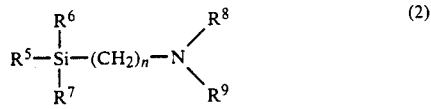

wherein $R^5$, $R^6$ and $R^7$ are an alkyl group or an alkoxyl group, $R^8$ and $R^9$ are an alkyl group, and n is an integer, said alkali metal-containing conjugated diene polymer being a living polymer having an alkali metal end prepared by a polymerization of a conjugated diene monomer or a mixture of a conjugated diene monomer and an aromatic vinyl monomer in a hydrocarbon solvent in the presence of an alkali metal-based catalyst, or a diene polymer to which an alkali metal is introduced by an addition reaction of a diene polymer having conjugated diene units in the polymer chain and an alkali metal-based catalyst in a hydrocarbon solvent.

The present invention also provides a rubber composition comprising the modified diene polymer and rubber additives. The composition has an improved impact resilience and a low hardness at low temperatures.

DETAILED DESCRIPTION

The term "alkali metal-containing conjugated diene polymer" as used herein means a diene polymer wherein an alkali metal is bonded to the diene polymer end or ends, obtained by polymerizing a conjugated diene monomer or a mixture of the diene monomer and other monomers copolymerizable with the diene monomer in the presence of an alkali metal-based catalyst; and a diene polymer obtained by addition of an alkali metal to a diene polymer having units of a conjugated diene in the polymer chain which has been previously prepared without being bound to the polymerization method, for example, by a solution polymerization method or an emulsion polymerization method.

The diene polymers used in the present invention include, for instance, homopolymers or copolymers of conjugated diene monomers such as 1,3-butadiene, isoprene, 1,3-pentadiene (piperylene), 2,3-dimethyl-1,3-butadiene, 1-phenyl-1,3-butadiene and 1,3-hexadiene, and copolymers of the conjugated diene monomers and other monomers copolymerizable therewith, e.g. aromatic vinyl compounds such as styrene, m- or p-methylstyrene, p-t-butylstyrene, a-methylstyrene, vinyltoluene, vinylnaphthalene, divinylbenzene, trivinylbenzene and divinylnaphthalene; unsaturated nitrile compounds such as acrylonitrile; acrylic acid esters and methacrylic acid esters; vinylpyridine; and the like. The diene polymers usable in the invention are not limited to these exemplified polymers. Representative examples of the diene polymers are, for instance, polybutadiene rubber, polyisoprene rubber, butadiene-isoprene copolymer and butadiene-styrene copolymer.

The diene polymer wherein an alkali metal is bonded to the diene polymer end or ends is, as mentioned above, those obtained by a polymerization using an alkali metal-based catalyst, and is living polymers having an alkali metal on at least one end of the polymer chain in the stage prior to terminating the polymerization. For instance, the living diene polymer can be prepared by a known living anionic polymerization method wherein monomer or monomers are polymerized in the presence of an alkali metal-based catalyst such as an organolithium initiator in a hydrocarbon solvent. Generally used chemicals such as alkali metal-based catalysts, polymerization solvents, randomizers and controlling agents for the microstructure of conjugated diene units can be used in the preparation of the living diene polymers. The polymerization manner is not particularly limited.

The alkali metal addition diene polymer is prepared from diene polymers obtained by polymerizing the conjugated diene monomer or a mixture thereof with other copolymerizable monomers in a usual polymerization manner, e.g. a solution polymerization using an alkali metal-based catalyst, an alkaline earth metal-based catalyst or a Ziegler catalyst, or an emulsion polymerization using a redox catalyst. Representative examples of the starting diene polymers are, for instance, polybutadiene rubber, polyisoprene rubber, butadiene-styrene copolymer rubber, butadiene-isoprene copolymer rubber, polypentadiene rubber, butadienepiperylene copolymer rubber, and butadiene-propylene alternate copolymer. An alkali metal is introduced to the diene polymers by an addition reaction of the diene polymers and alkali metal-based catalysts.

The addition of the alkali metal to the diene polymers is carried out by usually adopted methods. For instance, the diene polymer is reacted with a usual alkali metal-based catalyst in a hydrocarbon solvent in the presence of a polar compound such as an ether compound, an amine compound or a phosphine compound at a temperature of 30° to 100° C for tens of minutes to tens of hours, especially 10 minutes to 60 hours. The amount of the alkali metal-based catalyst is usually from 0.1 to 10 millimoles per 100 g of the diene polymer. When the amount is less than 0.1 millimole, the impact resilience is not improved. When the amount is more than 10 millimoles, a side reaction such as crosslinking or severance of the polymer occurs, thus resulting in no contribution to improvement of impact resilience. The amount of the polar solvent is usually from 0.1 to 10 moles, preferably from 0.5 to 2 moles, per mole of the alkali metal-based catalyst.

The alkali metal-based catalyst used in the living polymerization and the addition reaction includes, for instance, lithium, sodium, potassium, rubidium and cesium metals, hydrocarbon compounds of these metals, and complexes of these metals with polar compounds. Lithium or sodium compounds having 2 to 20 carbon atoms are preferable as the catalyst. Representative examples thereof are, for instance, ethyllithium, n-propyllithium, iso-propyllithium, n-butyllithium, sec-butyllithium, t-octyllithium, n-decyllithium, phenyllithium, 2-naphthyllithium, 2-butyl-phenyllithium, 4-phenyl-butyllithium, cyclohexyllithium, 4-cyclopentyllithium, 1,4-dilithio-butene-2, sodium naphthalene, sodium biphenyl, potassium-tetrahydrofuran complex, potassium diethoxyethane complex, and sodium salt of a-methylstyrene tetramer. The catalysts may be used alone or as an admixture thereof.

The polymerization reaction and the alkali metal addition reaction for preparing the alkali metal-containing conjugated diene polymers are carried out in a hydrocarbon solvent, or in a solvent which does not destroy the alkali metal-based catalysts, e.g. tetrahydrofuran, tetrahydropyran or dioxane.

The hydrocarbon solvent is suitably selected from aliphatic hydrocarbons, aromatic hydrocarbons and alicyclic hydrocarbons. Hydrocarbons having 2 to 12 carbon atoms are particularly preferred as the solvent. Preferable examples of the solvent are, for instance, propane, n-butane, iso-butane, n-pentane, iso-pentane, n-hexane, cyclohexane, propene, 1-butene, iso-butene, trans-2-butene, cis-2-butene, 1-pentene, 2-pentene, 1hexene, 2-hexene, benzene, toluene, xylene, and ethylbenzene. The solvents may be used alone or as an admixture thereof.

The alkali metal-containing diene polymer prepared by the living polymerization or the addition reaction is reacted with a modifier selected from a nitro compound having a nitro group in its molecule, a phosphoryl chloride compound of the formula (1):

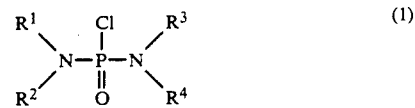

wherein $R^1$, $R^2$, $R^3$ and $R^4$ are an alkyl group, and an aminosilane compound of the formula (2):

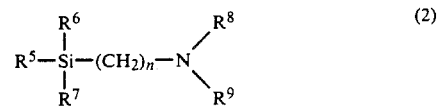

wherein $R^5$, $R^6$ and $R^7$ are an alkyl group or an alkoxyl group, $R^8$ and $R^9$ are an alkyl group, and n is an integer.

Representative examples of the nitro compound are given below.

(1) Aliphatic Nitro Compound mononitroparaffin such as nitromethane, nitroethane, 1-nitropropane, 2-nitropropane, 1-nitro-n-butane, 2-nitro-n-butane, 2-methyl-1-nitrobutane, 3-methyl-1-nitrobutane, 2-methyl-2-nitrobutane, 1-nitro-nhexane, 1-nitro-n-heptane, 1-nitro-n-octane, or 2-nitro-n-octane; mononitroolefin such as nitroethylene, 1-nitro1-propene, 2-nitropropene, 3-nitro-1-propene, 1-nitro-1-butene, 2-nitro-2-butene, 1-nitro-2-methyl-1-propene, 2-nitro-1-butene, 2-nitro-1-pentene, 3-nitro-1,3-pentadiene, 2-nitro-3-methyl-1,3-butadiene, 1-nitro-4-methyl-1-pentene, 2-nitro-1-hexene, 2-nitro-1-heptene, 1-nitro-1-octene, or 1-nitro-2,4,4-trimethyl-1-octene; monohalonitroparaffin such as chloronitromethane, bromonitromethane, 1-chloro-1-nitroethane, 1-bromo-1-nitroethane, 2-chloro-1-nitroethane, 1-chloro-1-nitropropane, 1-bromo-1-nitropropane, 2-chloro-1-nitropropane, 3-chloro-1-nitropropane, 1-chloro-2-nitropropane, 1-bromo-2-nitropropane, 2-chloro-2-nitropropane, 1,1-dichloro-1-nitroethane, 1,1-dibromo-1-nitroethane, 1,1-dichloro-1-nitropropane, 1,1-dibromo-1-nitropropane, chloropicrin, or bromopicrin; mononitroether such as methyl-2-nitroethyl ether, ethyl2-nitroethyl ether, 2-nitroethyl-n-propyl ether, 2nitroethyl isopropyl ether, n-butyl-2-nitroethyl ether, methyl-2-nitroisopropyl ether, 3-methoxy-2-nitrobutane, methyl-2-nitropropyl ether, n-butyl-2-nitroisopropyl ether, or ethylnitro-tert-butyl ether; mononitroketone such as nitroacetone, 4,4-dimethyl-5-nitro-2-pentanone, or methyl-2-nitroethyl ketone; dinitroparaffin such as 1,1-dinitroethane, 1,1-dinitropropane, 2,2-dinitropropane, 1,1-dinitropentane, 3,3-dinitropentane, 1,2-dinitroethane, 1,2-dinitropropane, 1,2-dinitrobutane, 2,3-dinitrobutane, 2-methyl-2,3-dinitropropane, 2,3-dimethyldinitrobutane, 1,3-dinitropropane, 1,4dinitrobutane, 1,5-dinitropentane, 1,6-dinitrohexane, 2,2-dimethyl-1,3-dinitropropane, tetrachloro-1,2-dinitroethane, or tetrabromo-1,2-dinitroethane; dinitroolefin such as 2,3-dinitro-2-butene or 3,4-dinitro-3-hexene; other polynitro compounds such as trinitromethane, 1,1,1-trinitroethane, chlorotrinitromethane, bromotrinitromethane, iodotrinitromethane, tetranitromethane, or hexanitroethane, and the like

(2) Alicyclic Nitro Compound nitrocyclopentane, 1-methyl-1-nitrocyclopentane, 1-methyl-2-nitrocyclopentane, cyclopentylnitromethane, nitrocyclohexane, 1-methyl-1-nitrocyclohexane, 1-nitrocyclohexane, 1,2-dimethyl-1-nitrocyclohexane, 1,3-dimethyl-1-nitrocyclohexane, 1,4-dimethyl-1-nitrocyclohexane, 1-bromo-1-nitrocyclohexane, 1,2dinitrocyclohexane, 1-nitromethylcyclohexane, 1nitromethylcyclohexene, and the like

(3) Aromatic Nitro Compound nitrobenzene, 1-chloro-3-nitrobenzoyl chloride, initrobeneze, 1,5-difluoro-2,4-dinitrobenzene, 3,5-dinitrobenzoyl chloride, p-dinitrobenzene, 1,2,3trinitrobenzene, 1,2,4-trinitrobenzene, 1,3,5trinitrobenzene, 1,2,3,5-tetranitrobenezene, 1,2,4,5-tetranitro-benzene, o-fluoronitrobenzene, m-fluoronitrobenzene, p-fluoronitrobenzene, 1-fluoro-2,4-dinitrobenzene, o-chloronitrobenzene, mchloronitrobenzene, p-chloronitrobenzene, 1-chloro-2,4-dinitrobenzene, 1-chloro-2,6-dinitrobenzene, 1-chloro3,4-dinitrobenzene, 1-chloro-2,4,6-trinitrobenzene, 3,4-dichloronitrobenzene, 3,5-dichloronitrobenzene, 2,4-dichloronitrobenzene, 2,5-dichloronitrobenzene, 4,5-dichloro-1,2-dinitrobenzene, 4,6-dichloro-1,3-dinitrobenzene, 2,5-dichloro-1,3-dinitrobenzene, 2,4,5-trichloronitrobenzene, 2-chloro-4-nitrotoluene, 2-chloro-6-nitrotoluene, 4-chloro-2-nitrotoluene, 2-chloro-3,4-dinitrotoluene, 2-chloro-3,5-dinitrotoluene, obromonitrobenzene, m-bromonitrobenzene, pbromonitrobenzene, 1-bromo-2,4-dinitrobenzene, 1-bromo-3,4-dinitrobenzene, 1-bromo-2,4,6-trinitrobenzene, 2,3-dibromonitrobenzene, 3,4-dibromonitrobenzene, 2,4-dibromonitrobenzene, 2,6-dibromonitrobenzene, 4,6-dibromo-1,3-dinitrobenzene, 2,5-dibromo-1,4dinitrobenzene, 2,4,6-tribromonitrobenzene, 2-bromo-4-nitrotoluene, 2-bromo-5-nitrotoluene, 3-bromo-2-nitrotoluene, 3-bromo-4-nitrotoluene, o-iodonitrobenzene, m-iodonitrobenzene, 1-iodo-2,4-dinitrobenzene, 1-iodo-3,4-dinitrobenzene, 3,4,5-triiodonitrobenzene, 1nitronaphthalene, 2-nitronaphthalene, dinitronaphthalenes, naphthalenes, nitromethylnaphthalenes, nitrophenylnaphthalenes, halonitronaphthalenes, halodinitronaphthalenes, 5-nitrotetralin, 6-nitrotetralin, 5,6-dinitrotetralin, 5,7-dinitrotetralin, 5,8-dinitrotetralin, 6,7-dinitrotetralin, 3-nitro-1,2-naphthoquinone, 7-nitro-1,2-naphthoquinone, 3-methyl-2-nitro-1,4-naphthoquinone, 4-chloro-3-nitro-1,2-naphthoquinone, 2,3-dichloro-5-nitro-1,4-naphthoquinone, nitroanthraquinone, dimethyl p-nitrophthalate, 4,4'-dinitrodiphenyl, 4,4'-dinitrodiphenylmethane, ethyl bis(2,4-dinitrophenyl) acetate, and the like

(4) Hetrocyclic Nitro Compound 7-chloro-4-nitrobenzofurazane, 2-chloro-5-nitropyridine, 2,4,5-trinitro-9-fluorene, 2,4,7-trinitro-9-fluorene, tetranitrocarbazole, and the like In the phosphoryl chloride compound of the formula (1), the alkyl groups $R^1$ to $R^4$ are usually those having 1 to 20 carbon atoms.

Representative examples of the phosphoryl chloride compounds (1) are, for instance, bis-(dimethylamino)phosphoryl chloride, bis(diethylamino)phosphoryl chloride, bis(dipropylamino)phosphoryl chloride, bis(diisobutylamino)phosphoryl chloride, and the like.

In the aminosilane compound of the formula (2), the alkyl or alkoxyl groups $R^5$ to $R^7$ are usually those having 1 to 20 carbon atoms, and the alkyl groups $R^8$ and $R^9$ are usually those having 1 to 20 carbon atoms. Also, the integer n is usually from 1 to 20.

Representative examples of the aminosilane compound (2) are, for instance, 3-dimethylaminomethyltrimethoxysilane, 3-dimethylaminoethyltrimethoxysilane, 3-dimethylaminopropyltrimethoxysilane, 3-dimethylaminobutyltrimethoxysilane, 3-dimethylaminomethyldimethoxymethylsilane, 3-dimethylaminomethyldimethoxymethylsilane, 3-dimethylaminopropyldimethoxymethylsilane, 3-dimethylaminobutyldimethoxymethylsilane, 3-dimethylaminomethyltriethoxysilane, 3-dimethylaminomethyltriethoxysilane, 3-dimethylaminopropyltriethoxysilane, propyltriethoxysilane, 3-dimethylaminomethyldiethoxymethylsilane, 3-dimethylaminomethyldiethoxymethylsilane, 3-dimethylaminopropyldiethoxymethylsilane, 3-dimethylaminobutyldiethoxymethylsilane, and the like. 3-Dimethylaminopropyldiethoxymethylsilane is particularly preferable.

The modifiers, namely the nitro compounds, phosphoryl chloride compounds (1) and aminosilane compounds (2), may be used alone or as an admixture thereof. The amount of the modifier is usually from 0.05 to 10 moles, preferably 0.2 to 2 moles, per mole of the alkali metal-based catalyst used in the living polymerization or alkali metal addition reaction for the production of the alkali metal-containing diene polymers.

The reaction between the modifier and the alkali metal-containing diene polymer proceeds rapidly. Accordingly, the reaction temperature and the reaction time can be selected from the wide ranges. In general, the reaction is effected at a temperature of from room temperature to 100° C for several seconds to several hours (about 3 seconds to about 6 hours).

Contacting the alkali metal-containing diene polymer with the modifier is sufficient for the reaction. Usually, the alkali metal containing diene polymer dissolved in a solvent is mixed with the modifier. For instance, the modification of diene polymers is conducted by a process wherein monomer or monomers are polymerized in a hydrocarbon solvent using an alkali metal-based catalyst, and to the resulting polymer solution is added a prescribed amount of the modifier; or a process wherein a diene polymer solution is subjected to the alkali metal addition reaction, and after the completion of the addition reaction, the modifier is subsequently added to the reaction mixture and the reaction is effected However, the process for reacting the polymer with the modifier is not limited to these processes.

Thus, the nitro compound, the phosphoryl chloride compound, and/or the aminosilane compound are introduced to the polymer chain end or into the polymer chain.

After the completion of the reaction, the modified diene polymer is coagulated from the reaction mixture (solution) by known methods as applied in the preparation of rubbers by a usual solution polymerization, for example, by an addition of a coagulant to the reaction mixture or by a steam coagulation. The coagulation temperature is not particularly limited.

The drying of the polymer crumbs separated from the reaction system can also be effected by usual methods as used in the preparation of usual synthetic rubbers, for example, by a band dryer or a dryer of extrusion type. The drying temperature is not particularly limited.

The modified conjugated diene polymers according to the present invention are improved in impact resilience and hardness at low temperatures as compared with nonmodified diene polymers. Accordingly, the modified diene polymers are particularly suitable for use in automobile tires. Further, they can also be used as raw material rubbers for various industrial purposes such as boot and shoe bottom, floor material and vibrationproof rubber. The modified diene polymers can be incorporated with usual rubber additives to provide a rubber composition and cured in a usual manner to provide cured products.

The modified diene polymer according to the present invention may be used alone or in combination with other known rubbers. Examples of the other rubbers are, for instance, emulsion-polymerized styrene-butadiene copolymer, rubbers prepared by solution polymerization using an anionic polymerization catalyst, a Ziegler catalyst, etc., e.g. polybutadiene rubber, styrenebutadiene copolymer rubber, polyisoprene rubber and butadiene-isoprene copolymer rubber, natural rubber, and the like. One or more of these rubbers are selected according to the purposes It is necessary that the rubber component contains at least 10% by weight, preferably at least 20 by weight, of the modified diene polymer. When the amount of the modified diene polymer is less than 10 % by weight, the improvement in the impact resilience cannot be expected The Mooney viscosity ($ML_{1+4}100°$ C) of the modified diene polymer is usually from 10 to 200, preferably from 20 to 150. When the Mooney viscosity is less than 10, the mechanical properties such as tensile strength are poor. When the Mooney viscosity is more than 200, the processability or workability is lowered since the compatibility with other rubbers is poor, and consequently the mechanical properties of the cured rubbers are lowered.

All or a part of the rubber component may be used as an oil extended rubber.

The rubber composition of the present invention is prepared by mixing the rubber component with various additives using a mixing machine such as a roll mill or a Banbury mixer. The additives used are not particularly limited, and are selected from additives usually used in the rubber industry, e.g. a curing system using sulfur, stearic acid, zinc oxide, a curing accelerator such as thiazole accelerator, thiuram accelerator or sulfenamide accelerator, and/or an organic peroxide; a reinforcing agent such as HAF carbon black, ISAF carbon black or other various grades of carbon blacks, or silica; a filler such as calcium carbonate or talc; and other additives such as process oil, processing assistant and antioxidant. The kinds and amounts of the rubber additives to be used are selected according to the purposes of the rubber composition, and are not particularly limited in the present invention.

The present invention is more specifically described and explained by means of the following Examples in which all percents and parts are by weight unless otherwise noted. It is to be understood that the present invention is not limited to these Examples.

EXAMPLE 1

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 6.0 millimoles of n-butyllithium dissolved in nhexane. The polymerization was carried out at 50° C for 1 hour with stirring.

After the completion of the polymerization, 3.0 millimoles of p-chloronitrobenzene was added to the reaction mixture. After conducting the reaction for 30 minutes with stirring, 10 ml of methanol was added to the reaction mixture and the mixture was further stirred for 5 minutes.

The reaction mixture was then taken out from the vessel. To the reaction mixture was added 5 g of 2,6-di-t-butyl-p-cresol (commercially available under the trade mark "Sumilizer" BHT made by Sumitomo Chemical Co., Ltd.), and a large portion of n-hexane was evaporated followed by drying under reduced pressure at 60° C for 24 hours.

The Mooney viscosity and the content of 1,2-bonding units (hereinafter referred to as "vinyl content") of the obtained elastomeric polymer were measured. The vinyl content was measured according to infrared spectrophotometry.

The produced polymer had a Mooney viscosity of 77 and a vinyl content of 70 %.

COMPARATIVE EXAMPLE 1

The procedure of Example 1 was repeated except that p-chloronitrobenzene was not used.

The produced elastomeric polymer had a Mooney viscosity of 23 and a vinyl content of 70 %.

COMPARATIVE EXAMPLE 2

The procedure of Example 1 was repeated except that p-chloronitrobenzene was not used and n-butyllithium was used in an amount of 3.9 millimoles instead of 6.0 millimoles.

The produced elastomeric polymer had a Mooney viscosity of 77 and a vinyl content of 70 %.

EXAMPLE 2

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 5.0 millimoles of n-butyllithium dissolved in n-hexane. The polymerization was carried out at 50° C for 1 hour with stirring.

After the completion of the polymerization, 5.0 millimoles of chloropicrin was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced elastomeric polymer had a Mooney viscosity of 84 and a vinyl content of 70%.

COMPARATIVE EXAMPLE 3

The procedure of Example 2 was repeated except that chloropicrin was not used.

The produced elastomeric polymer had a Mooney viscosity of 46 and a vinyl content of 70%.

COMPARATIVE EXAMPLE 4

The procedure of Example 2 was repeated except that chloropicrin was not used and n-butyllithium was used in an amount of 3.8 millimoles instead of 5.0 millimoles.

The produced elastomeric polymer had a Mooney viscosity of 84 and a vinyl content of 70%.

EXAMPLE 3

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 6.4 millimoles of n-butyllithium dissolved in nhexane. The polymerization was carried out at 50° C for 1 hour with stirring.

After the completion of the polymerization, 3.2 millimoles of dimethyl p-nitrophthalate was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced elastomeric polymer had a Mooney viscosity of 56 and a vinyl content of 70%.

COMPARATIVE EXAMPLE 5

The procedure of Example 3 was repeated except that dimethyl p-nitrophthalate was not used.

The produced elastomeric polymer had a Mooney viscosity of 17 and a vinyl content of 70%.

COMPARATIVE EXAMPLE 6

The procedure of Example 3 was repeated except that dimethyl p-nitrophthalate was not used and n-butyllithium was used in an amount of 4.5 millimoles instead of 6.4 millimoles.

The produced elastomeric polymer had a Mooney viscosity of 56 and a vinyl content of 70 %.

EXAMPLE 4

A 10 liter stainless steel polymerization vessel was washed, dried and replaced with nitrogen, and it was charged with 750 g of 1,3-butadiene, 250 g of styrene, 4,300 g of n-hexane, 23 g of tetrahydrofuran and 6.4 millimoles of n-butyllithium dissolved in n-hexane. The polymerization was carried out at 50° C for 1 hour with stirring.

After the completion of the polymerization, 3.2 millimoles of p-chloronitrobenzene was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The Mooney viscosity, styrene content and vinyl content of the obtained elastomeric polymer were measured. The measurement of styrene content was made by a refractive index method.

The produced elastomeric polymer had a Mooney viscosity of 77, a styrene content of 25 % and a vinyl content of 40 %.

COMPARATIVE EXAMPLE 7

The procedure of Example 4 was repeated except that p-chloronitrobenzene was not used.

The produced elastomeric polymer had a Mooney viscosity of 23, a styrene content of 25 % and a vinyl content of 40 %.

COMPARATIVE EXAMPLE 8

The procedure of Example 4 was repeated except that p-chloronitrobenzene was not used and n-butyllithium was used in an amount of 4.0 millimoles instead of 6.4 millimoles.

The produced elastomeric polymer had a Mooney viscosity of 77, a styrene content of 25 % and a vinyl content of 40 %.

EXAMPLE 5

A 10 liter stainless steel polymerization vessel was washed, dried and replaced with nitrogen, and it was charged with 750 g of 1,3-butadiene, 250 g of styrene, 4,300 g of n-hexane, 23 g of tetrahydrofuran and 5.2 millimoles of n-butyllithium dissolved in n-hexane. The polymerization was carried out at 50° C for 1 hour with stirring.

After the completion of the polymerization, 5.2 millimoles of chloropicrin was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced elastomeric polymer had a Mooney viscosity of 84, a styrene content of 25 % and a vinyl content of 40 %.

COMPARATIVE EXAMPLE 9

The procedure of Example 5 was repeated except that chloropicrin was not used.

The produced elastomeric polymer had a Mooney viscosity of 46, a styrene content of 25 % and a vinyl content of 40 %.

COMPARATIVE EXAMPLE 10

The procedure of Example 5 was repeated except that chloropicrin was not used and n-butyllithium was used in an amount of 3.8 millimoles instead of 5.2 millimoles.

The produced elastomeric polymer had a Mooney viscosity of 84, a styrene content of 25 % and a vinyl content of 40 %.

EXAMPLE 6

A 10 liter stainless steel polymerization vessel was washed, dried and replaced with nitrogen, and it was charged with 750 g of 1,3-butadiene, 250 g of styrene, 4,300 g of n-hexane, 23 g of tetrahydrofuran and 7.2 millimoles of n-butyllithium dissolved in n-hexane. The polymerization was carried out at 50° C for 1 hour with stirring.

After the completion of the polymerization, 3.6 millimoles of dimethyl p-nitrophthalate was added to the reaction mixture. After conducting the reaction for 30 minutes with stirring, 10 ml of methanol was added and the reaction mixture was further stirred for 5 minutes.

The reaction mixture was then taken out from polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced elastomeric polymer had a Mooney viscosity of 56, a styrene content of 25 % and a vinyl content of 40 %.

COMPARATIVE EXAMPLE 11

The procedure of Example 6 was repeated except that dimethyl p-nitrophthalate was not used.

The produced elastomeric polymer had a Mooney viscosity of 17, a styrene content of 25 % and a vinyl content of 70 %.

COMPARATIVE EXAMPLE 12

The procedure of Example 6 was repeated except that dimethyl p-nitrophthalate was not used and n-butyllithium was used in an amount of 4.8 millimoles instead of 7.2 millimoles.

The produced elastomeric polymer had a Mooney viscosity of 56, a styrene content of 25 % and a vinyl content of 40%.

Preparation of Compounded Rubber and Physical Properties of Cured Rubber

A compounded rubber was prepared by mixing each of the polymers obtained in Examples 1 to 6 and Comparative Examples 1 to 12 with rubber additives on mixing rolls according to the recipe shown in Table 1. It was then press-cured at 160° C for 30 minutes.

The impact resilience (rebound resilience) of the cured rubber was measured at 60° C using a Lupke resilience tester. The hardness (JIS A hardness) of the cured rubber was measured at −20° C according to JIS K 6301.

The results are shown in Table 2.

TABLE 1

| Ingredients | parts |
| --- | --- |
| Polymer | 100 |
| HAF carbon black*1 | 50 |
| Aromatic oil*2 | 10 |
| Zinc oxide | 5 |
| Stearic acid | 2 |
| Curing accelerator*3 | 2 |
| Sulfur | 1.5 |

(notes)
*1N-339
*2Aromatic oil having a flow point of 27° C.
*3N-cyclohexyl-2-benzothiazylsulfenamide

EXAMPLE 7 AND COMPARATIVE EXAMPLE 13

A 10 liter stainless steel polymerization vessel washed and dried was charged with 500 g of a styrene-butadiene copolymer (Mooney viscosity 51, styrene content 25 %, vinyl content 40 %) and 4,300 g of n-hexane, and the copolymer was dissolved with stirring. To the vessel were added 6.4 millimoles of n-butyllithium dissolved in n-hexane and 6.4 millimoles of tetramethylethylenediamine, and the reaction was carried out at 70° C for 1 hour.

To the vessel was then added 3.2 millimoles of p-chloronitrobenzene, and the reaction was carried out for 30 minutes with stirring. After adding 10 ml of methanol to the vessel, the mixture was further stirred for 5 minutes.

The reaction mixture was then taken out from the vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The obtained polymer had a Mooney viscosity of 66.

A compounded rubber was prepared using the obtained polymer and cured and the physical properties of the cured rubber were measured in the same manner as in Examples 1 to 6.

Also, with respect to the nonmodified copolymer, namely the styrene-butadiene copolymer (Mooney viscosity 51, styrene content 25 %, vinyl content 40 %), the compounding, curing and measurement of physical properties were repeated (Comparative Example 13).

The results are shown in Table 2.

TABLE 2

| | Nitro compound modifier | Mooney viscosity | Impact resilience (%) | JIS hardness |
| --- | --- | --- | --- | --- |
| Example 1 | p-chloronitrobenzene | 77 | 67 | 75 |
| Com. Ex. 1 | — | 23 | 55 | 83 |
| Com. Ex. 2 | — | 77 | 63 | 82 |
| Example 2 | chloropicrin | 84 | 68 | 78 |
| Com. Ex. 3 | — | 46 | 59 | 83 |
| Com. Ex. 4 | — | 84 | 64 | 81 |
| Example 3 | dimethyl p-nitrophthalate | 56 | 64 | 79 |
| Com. Ex. 5 | — | 17 | 53 | 85 |
| Com. Ex. 6 | — | 56 | 59 | 83 |
| Example 4 | p-chloronitrobenzene | 77 | 63 | 77 |
| Com. Ex. 7 | — | 23 | 52 | 85 |
| Com. Ex. 8 | — | 77 | 59 | 84 |
| Example 5 | chloropicrin | 84 | 64 | 80 |
| Com. Ex. 9 | — | 46 | 55 | 85 |
| Com. Ex. 10 | — | 84 | 60 | 83 |
| Example 6 | dimethyl p-nitrophthalate | 56 | 60 | 81 |
| Com. Ex. 11 | — | 17 | 50 | 87 |
| Com. Ex. 12 | — | 56 | 56 | 85 |
| Example 7 | p-chloronitrobenzene | 66 | 63 | 78 |
| Com. Ex. 13 | — | 51 | 55 | 85 |

EXAMPLE 8

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 4.7 millimoles of n-butyllithium dissolved in n-hexane. The polymerization was carried out at 50° C for 1 hour with stirring.

After the completion of the polymerization, 4.7 millimoles of bis(dimethylamino)phosphoryl chloride was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced elastomeric polymer had a Mooney viscosity of 54 and a vinyl content of 70%.

COMPARATIVE EXAMPLE 14

The procedure of Example 8 was repeated except that bis(dimethylamino)phosphoryl chloride was not used.

The produced elastomeric polymer had a Mooney viscosity of 45 and a vinyl content of 70%.

COMPARATIVE EXAMPLE 15

The procedure of Example 8 was repeated except that bis(dimethylamino)phosphoryl chloride was not used and n-butyllithium was used in an amount of 4.4 millimoles instead of 4.7 millimoles.

The produced elastomeric polymer had a Mooney viscosity of 54 and a vinyl content of 70%.

A 10 liter stainless steel polymerization vessel was washed, dried and replaced with nitrogen, and it was charged with 750 g of 1,3-butadiene, 250 g of styrene, 4,300 g of n-hexane, 23 g of tetrahydrofuran and 5.2 millimoles of n-butyllithium dissolved in n-hexane The polymerization was carried out at 50° C for 1 hour with stirring.

After the completion of the polymerization, 5.2 millimoles of bis(dimethylamino)phosphoryl chloride was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced polymer had a Mooney viscosity of 54, a styrene content of 25 % and a vinyl content of 40%.

COMPARATIVE EXAMPLE 16

The procedure of Example 9 was repeated except that bis(dimethylamino)phosphoryl chloride was not used.

The produced polymer had a Mooney viscosity of 45, a styrene content of 25 % and a vinyl content of 40%.

COMPARATIVE EXAMPLE 17

The procedure of Example 9 was repeated except that bis(dimethylamino)phosphoryl chloride was not used and n-butyllithium was used in an amount of 4.9 millimoles instead of 5.2 millimoles.

The produced polymer had a Mooney viscosity of 54, a styrene content of 25 % and a vinyl content of 40%.

EXAMPLE 10 and COMPARATIVE EXAMPLE 18

A 10 liter stainless steel polymerization vessel washed and dried was charged with 500 g of a styrene-butadiene copolymer (Mooney viscosity 51, styrene content 25%, vinyl content 40%) and 4,300 g of nhexane, and the copolymer was dissolved with stirring. To the vessel were added 6.4 millimoles of n-butyllithium dissolved in n-hexane and 6.4 millimoles of tetramethylethylenediamine, and the reaction was carried out at 70° C for 1 hour.

To the vessel was then added 5.2 millimoles of bis(dimethylamino)phosphoryl chloride, and the reaction was carried out for 30 minutes with stirring. After adding 10 ml of methanol to the vessel, the mixture was further stirred for 5 minutes.

The reaction mixture was then taken out from the vessel. To the reaction mixture was added 5 g of 2,6-di-t-butyl-p-cresol BHT), and a large portion of n-hexane was evaporated followed by drying under reduced pressure at 60° C for 24 hours.

The obtained polymer had a Mooney viscosity of 57.

Also, the nonmodified copolymer, namely the styrene-butadiene copolymer (Mooney viscosity 51, styrene content 25 %, vinyl content 40 %), was used in the measurement of physical properties described after (Comparative Example 18).

EXAMPLE 11

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 6.0 millimoles of n-butyllithium dissolved in n-hexane. The polymerization was -carrie-..-.d-.out--at 50° C for 1 hour with stirring.

After the completion of the polymerization, 4.1 millimoles of 3-dimethylaminopropyldiethoxymethylsilane was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced polymer had a Mooney viscosity of 85 and a vinyl content of 70 %.

COMPARATIVE EXAMPLE 19

The procedure of Example 11 was repeated except that 3-dimethylaminopropyldiethoxymethylsilane was not used.

The produced polymer had a Mooney viscosity of 85 and a vinyl content of 70%.

EXAMPLE 12

A 10 liter stainless steel polymerization vessel was washed, dried and replaced with nitrogen, and it was char9ed with 1,000 g of 1,3-butadiene, 4,300 g of n-hexane, 40 millimoles of ethylene glycol diethyl ether and 4.4 millimoles of n-butyllithium dissolved in n-hexane.

The polymerization was carried out at 50° C for 1 hour with stirring.

After the completion of the polymerization, 4.4 millimoles of 3-dimethylaminopropyldiethoxymethylsilane was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C for 24 hours.

The produced polymer had a Mooney viscosity of 85, a styrene content of 25 % and a vinyl content of 40%.

COMPARATIVE EXAMPLE 20

The procedure of Example 12 was repeated except that 3-dimethylaminopropyldiethoxymethylsilane was not The produced polymer had a Mooney viscosity of 85, a styrene content of 25 % and a vinyl content of 40%.

EXAMPLE 13 and COMPARATIVE EXAMPLE 21

A 10 liter stainless steel polymerization vessel washed and dried was charged with 500 g of a styrene-butadiene copolymer (Mooney viscosity 51, styrene content 25 %, vinyl content 40 %) and 4,300 g of n-hexane, and the copolymer was dissolved with stirring. To the vessel were added 6.4 millimoles of n-butyllithium dissolved in n-hexane and 6.4 millimoles of tetramethylethylenediamine, and the reaction was carried out at 70° C for 1 hour.

To the vessel was then added 6.4 millimoles of 3-dimethylaminopropyldiethoxymethylsilane, and the reaction was carried out for 30 minutes with stirring. After adding 10 ml of methanol to the vessel, the mixture was further stirred for 5 minutes.

The reaction mixture was then taken out from the vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The obtained polymer had a Mooney viscosity of 51.

Also, the nonmodified copolymer, namely the styrene-butadiene copolymer (Mooney viscosity 51, styrene content 25 %, vinyl content 40 %), was used in the following measurement of physical properties (Comparative Example 21).

Using the polymers obtained in Examples 8 to 13 and Comparative Examples 14 to 21, the preparation of compounded rubbers, curing thereof and measurement of physical properties of the cured products were made in the same manner as in Examples 1 to 6.

The results are shown in Table 3.

TABLE 3

| | Modifier | Mooney viscosity | Impact resilience (%) | JIS hardness |
|---|---|---|---|---|
| Example 8 | bis(dimethylamino)phosphoryl chloride | 54 | 66 | 78 |
| Com. Ex. 14 | — | 45 | 56 | 84 |
| Com. Ex. 15 | — | 54 | 57 | 83 |
| Example 9 | bis(dimethylamino)phosphoryl chloride | 54 | 63 | 79 |
| Com. Ex. 16 | — | 45 | 54 | 85 |
| Com. Ex. 17 | — | 54 | 55 | 84 |
| Example 10 | bis(dimethylamino)phosphoryl choride | 57 | 60 | 81 |
| Com. Ex. 18 | — | 51 | 55 | 85 |
| Example 11 | 3-dimethylaminopropyldiethoxymethylsilane | 85 | 68 | 78 |
| Com. Ex. 19 | — | 85 | 62 | 84 |
| Example 12 | 3-dimethylaminopropyldiethoxymethylsilane | 85 | 66 | 79 |
| Com. Ex. 20 | — | 85 | 60 | 85 |
| Example 13 | 3-dimethylaminopropyldiethoxymethylsilane | 51 | 63 | 80 |
| Com. Ex. 21 | — | 51 | 55 | 85 |

From the results shown in Tables 2 and 3, it is understood that the polymers prepared according to the present invention have a very high impact resilience and a very low hardness at low temperatures as compared with the polymers prepared in the same manner except for no use of the modifier and the polymers having the same Mooney viscosity but prepared without using the modifier.

In addition to the ingredients used in the Examples, other ingredients can be used in the Examples as set forth in the specification to obtain substantially the same results.

What we claim is:

1. A process for preparing a modified diene polymer which comprises reacting an alkali metal-containing conjugated diene polymer with an aminosilane compound of the formula (2):

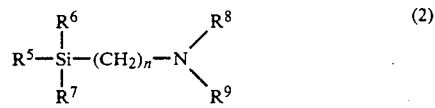

wherein each of $R^5$, $R^6$ and $R^7$ is an alkyl group or an alkoxy group, each of $R^8$ and $R^9$ is an alkyl group, and n is an integer, said alkali metal-containing conjugated diene polymer being a living polymer having an alkali metal end prepared by a polymerization of a conjugated diene monomer or a mixture of a conjugated diene monomer and an aromatic vinyl monomer in a hydrocarbon solvent in the presence of an alkali metal-based catalyst, or a polymer to which an alkali metal is introduced by an addition reaction of a diene polymer having conjugated diene units in the polymer chain and an alkali metal-based catalyst in a hydrocarbon solvent.

2. The process of claim 1, wherein said alkali metal-based catalyst is a member selected from the group consisting of an alkali metal, an alkali metal hydrocarbon compound and a complex of an alkali metal with a polar compound.

3. The process of claim 1, wherein 0.05 to 10 moles of the modifier is used per mole of said alkali-metal based catalyst used in the preparation of said alkali-metal containing conjugated diene polymer.

4. The process of claim 1, wherein said alkali-metal containing conjugated diene polymer is in the form of a solution in a hydrocarbon solvent.

5. The process of claim 1, wherein the reaction of the alkali-metal containing conjugated diene polymer and the modifier is carried out at a temperature of from room temperature to 100° C.

6. A rubber composition comprising a rubber component containing at least 10% by weight of a modified diene polymer and rubber additives, said modified diene polymer being a conjugated diene polymer modified by reacting an alkali metal-containing conjugated diene polymer selected from the group consisting of a conjugated diene polymer having an active metal end and an alkali metal addition product of a conjugated diene polymer with an aminosilane compound of the formula (2):

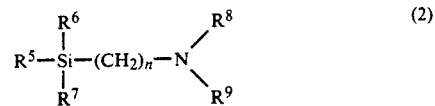

wherein each of $R^5$, $R^6$ and $R^7$ is an alkyl group or an alkoxy group, each of $R^8$ and $R^9$ is an alkyl group, and $n$ is an integer.

* * * * *